(12) United States Patent
Brown et al.

(10) Patent No.: US 7,621,487 B2
(45) Date of Patent: Nov. 24, 2009

(54) TWIST-LOCK BASE FOR PIPE HOLDERS

(75) Inventors: Larry Brown, San Diego, CA (US);
Dennis Hart, Reno, NV (US)

(73) Assignee: Securus, Inc., Vista, CA (US)

( * ) Notice: Subject to any disclaimer, the term of this patent is extended or adjusted under 35 U.S.C. 154(b) by 391 days.

(21) Appl. No.: 11/313,566

(22) Filed: Dec. 21, 2005

(65) Prior Publication Data

US 2007/0138350 A1    Jun. 21, 2007

(51) Int. Cl.
*F16L 3/08* (2006.01)
(52) U.S. Cl. ............................. 248/65; 248/72; 411/85; 411/104
(58) Field of Classification Search ............ 4/695; 248/49, 65, 68.1, 71, 72, 73, 74.1, 74.4; 411/85, 411/104, 349, 549, 552, 553, 38
See application file for complete search history.

(56) References Cited

U.S. PATENT DOCUMENTS

| | | | |
|---|---|---|---|
| 1,129,553 A | 2/1915 | Cope | |
| 1,349,977 A * | 8/1920 | Mulkern | ............... 411/38 |
| 2,354,919 A | 8/1944 | Lockwood | |
| 3,128,073 A | 4/1964 | Berlyn | |
| 3,188,030 A | 6/1965 | Fischer | |
| 3,208,560 A * | 9/1965 | Cote | ............... 403/252 |
| 3,295,805 A * | 1/1967 | Girard | ............... 248/68.1 |
| D212,505 S | 10/1968 | Guerrero et al. | |
| 3,878,274 A | 4/1975 | Murayama et al. | |
| 3,916,488 A | 11/1975 | Gazda et al. | |
| 3,944,175 A | 3/1976 | Kearney | |
| 4,037,810 A | 7/1977 | Pate | |
| 4,051,035 A | 9/1977 | Boschen | |
| 4,204,135 A | 5/1980 | Murayama | |
| 4,353,763 A | 10/1982 | Simons | |
| D269,155 S | 5/1983 | Rose | |
| 4,395,009 A | 7/1983 | Bormke | |
| 4,458,385 A | 7/1984 | Espinoza | |

(Continued)

OTHER PUBLICATIONS

U.S. Appl. No. 11/287,004, filed Nov. 22, 2005, Larry D. Brown.

*Primary Examiner*—J. Allen Shriver, II
*Assistant Examiner*—Bradley H Duckworth
(74) *Attorney, Agent, or Firm*—Stetina Brunda Garred & Brucker; Lowell Anderson (57) ABSTRACT

A support is provided for conduit held on a channel member having a C-shaped cross section with lips extending toward the back wall of the channel. The support has a base with one surface adapted to fasten to the conduit. The second surface has a twist-lock fastener that includes a first and second plate, each having a width sized to fit through the space between the lips and having a length about the same as the distance between the sides of the channel. Two V-shaped deformable members join these plates adjacent the ends on the longest side of the plates. Each V-shaped member is joined to a different plate and the bends at the juncture of the two legs of the V-shaped member abut the side walls of the channel. The bends are adjacent the ends and extend beyond the plates to wedge against the channel sides as a screw draws the plates together and moves the legs of the V shaped member toward each other.

32 Claims, 9 Drawing Sheets

U.S. PATENT DOCUMENTS

| | | | |
|---|---|---|---|
| 4,544,685 A | 10/1985 | Hoelzer | |
| 4,545,697 A * | 10/1985 | Verdenne et al. | 403/230 |
| 4,555,589 A | 11/1985 | Osada | |
| 4,562,982 A | 1/1986 | McSherry et al. | |
| 4,655,023 A | 4/1987 | Yung | |
| 4,679,754 A | 7/1987 | Richards | |
| 4,763,867 A | 8/1988 | Hungerford, Jr. | |
| 4,766,651 A | 8/1988 | Kobayashi | |
| 4,770,939 A | 9/1988 | Sietsess et al. | |
| 4,781,433 A | 11/1988 | Arroyo et al. | |
| D299,213 S | 1/1989 | Puntillo | |
| 4,899,963 A | 2/1990 | Murphy | |
| 4,899,964 A | 2/1990 | Sick | |
| 4,905,942 A | 3/1990 | Moretti | |
| 4,919,372 A | 4/1990 | Twist et al. | |
| 4,930,544 A | 6/1990 | Ziu | |
| 4,957,251 A | 9/1990 | Hubbard | |
| 4,963,609 A | 10/1990 | Anderson et al. | |
| 4,993,669 A | 2/1991 | Dyer | |
| 5,002,244 A | 3/1991 | Holbury et al. | |
| 5,018,260 A | 5/1991 | Ziu | |
| 5,131,613 A | 7/1992 | Kamiya et al. | |
| 5,149,026 A | 9/1992 | Allen | |
| 5,303,887 A | 4/1994 | Hasty et al. | |
| 5,367,127 A | 11/1994 | Dormon | |
| 5,375,798 A * | 12/1994 | Hungerford, Jr. | 248/58 |
| D368,422 S | 4/1996 | Jensen | |
| 5,547,152 A | 8/1996 | Krock | |
| 5,583,190 A | 12/1996 | Brinati et al. | |
| 5,598,995 A | 2/1997 | Meuth et al. | |
| 5,624,217 A * | 4/1997 | Hungerford, Jr. | 411/85 |
| D379,584 S | 6/1997 | Lindquist | |
| 5,655,738 A | 8/1997 | Ragsdale et al. | |
| 5,704,571 A * | 1/1998 | Vargo | 248/58 |
| 5,769,365 A * | 6/1998 | Onishi et al. | 248/49 |
| 5,833,179 A | 11/1998 | VandenBerg | |
| 5,871,193 A | 2/1999 | Jacobs et al. | |
| 5,876,000 A * | 3/1999 | Ismert | 248/65 |
| D408,273 S | 4/1999 | Senninger | |
| 5,893,538 A * | 4/1999 | Onishi et al. | 248/65 |
| 5,964,434 A | 10/1999 | Lynch, Jr. | |
| 6,032,907 A | 3/2000 | Santa Cruz et al. | |
| 6,126,122 A | 10/2000 | Ismert | |
| 6,129,317 A | 10/2000 | Rodrigues et al. | |
| 6,224,025 B1 | 5/2001 | Alvarez | |
| 6,250,847 B1 | 6/2001 | Bingham, Jr. | |
| 6,386,489 B1 | 5/2002 | Gretz | |
| 6,511,028 B1 * | 1/2003 | Gretz | 248/222.52 |
| 6,588,711 B2 * | 7/2003 | Onishi | 248/49 |
| 6,872,038 B2 * | 3/2005 | Westlake | 411/85 |
| 6,923,407 B2 * | 8/2005 | Takeuchi | 248/73 |
| 6,959,520 B2 | 11/2005 | Hartman | |
| 7,044,701 B2 * | 5/2006 | Herb | 411/84 |
| 7,246,547 B2 * | 7/2007 | Van Walraven | 81/461 |
| 2005/0006535 A1 | 1/2005 | Brown | |
| 2005/0182167 A1 | 8/2005 | Goodson et al. | |
| 2006/0197338 A1 | 9/2006 | Ziu et al. | |

* cited by examiner

TWIST-LOCK BASE FOR PIPE HOLDERS

BACKGROUND

This invention relates to a base for supporting pipes, conduits and other items in channels, where the base is inserted into a channel and then twisted to fasten the base to the channel.

Pipes and electrical conduit are held to walls or supports of buildings by lengths of formed channel extending between adjacent structural supports. The prior art inserts a base into the channel and then rotates the base to wedge it against opposing sides of the channel. But the stability of these supports are limited because the support has to be manually rotated into position, and the need to rotate the support limits the wedging effect that remains after the rotation is completed. There is thus a need for a conduit support that can more securely fasten to the channel.

BRIEF SUMMARY

A support is provided for conduit to be held on a channel member having a C-shaped cross section with lips extending inward toward each other from the sides of the channel and then toward the back wall of the channel. The support has a base with a first surface adapted to fasten to the conduit. A second surface has a twist-lock fastener that includes a first and second plate, each having a width sized to fit through the space between the conduit lips and having a length about the same as the distance between the sides of the channel. The first and second plates are spaced apart slightly, having an approximately parallel relationship to each other. The first plate is formed integral with but offset from the base, while the second plate is joined to the first plate by two deformable V-shaped members, along at least a portion of the plate width, at opposing ends of the pair of plates. Each leg of each V-shaped member is joined to a different one of the plates, and the outside surface at the juncture of the two legs of each V-shaped member abuts the inside walls of the channel when the twist-lock fastener is inserted into the channel and rotated 90 degrees. The outside surface at the juncture of the two legs extends outward beyond the plates to wedge against the channel sides as a screw draws the first and second plates together (toward each other) and moves the legs of the V-shaped member together.

There is thus advantageously provided a support for items held by a channel member having opposing sides joined by a back. The sides of the channel are spaced a distance apart and each side ends in a lip extending toward the other lip and then toward a back wall of the channel. The support includes a base having first and second opposing surfaces and a first and second plate. The first plate is fastened to the second surface of the base and has opposing first and second ends defining a length that is about the same as the distance between the opposing sides of the channel. At least one end of the first plate preferably, but optionally has a corner that is cammed. The second plate is offset from and aligned with the first plate. The second plate also has opposing first and second ends defining a length about the same as the distance between the opposing sides of the channel member with at least one end of the second plate having a corner that is cammed. Preferably, but optionally, the second plate has a length slightly less than that of the first plate. A first deformable member extends between adjacent first ends of the first and second plates and a second deformable member extending between adjacent second ends of the first and second plates. The deformable members each have a bend orientated to extend beyond the ends of the plates as the plates move together. The first surface of the base is adapted to fasten to an elongated tubular member.

In further embodiments, the lower surface of the first plate faces an upper surface of the second plate, and the lower surface has a recess configured to receive a projection on the upper surface. Further, the support is integrally molded of a polymer material, with Nylon being preferred. In one embodiment each deformable member has a width that is less than about half a width of the first plate and has an edge extending along a side of the first plate. In another embodiment the deformable member is connected to the first and second plates at a location located in the outer ⅓ periphery of each plate. Advantageously, the first and second deformable members are located at diagonally opposing corners of the first and second plates. Preferably, but optionally, the first plate has two cammed portions, located at diagonally opposing corners of the first plate, and the second plate has two cammed portions, located at diagonally opposing corners of the second plate.

The first surface of the base is adapted to fasten to an elongated tubular member, and various mechanisms can be used. These include at least one threaded recess, or a plumbing strap, or an adjustable length strap having at least one end fastened to the support and preferably having both ends fastened to the support. In a further embodiment the base has opposing ends with an elongated spring member extending from a lower surface of the base adjacent each end of the support and in a direction parallel to the length or long axis of the first plate. Advantageously, the base and the first plate are offset a distance sufficient to locate the upper surface of the first plate below but adjacent to an interior end of a lip on the channel during use of the support. Preferably, but optionally, the deformable member has two legs joined by a bend. The legs join adjacent surfaces on the plates, and the two bends are located between diagonally opposing corners of the plates.

There is also provided a support having a base with first and second opposing surfaces, and first and second plates. The first plate is fastened to the second surface of the base. The first plate has opposing first and second ends defining a length about the same as the distance between the opposing sides of the channel member. The second plate has similar construction. A deformable member connects the first and second plates adjacent an end of each plate. The deformable member has a bend that moves outward toward an adjacent side of the channel during use as the space between the plates is reduced. The deformable member moves outward a distance sufficient to press against the adjacent side during use. The support also includes a conduit holding mechanism on the first surface of the support, where the mechanism is adapted to fasten a conduit to the support.

In further variations the deformable member of this embodiment comprises two legs having a first end joined at the bend to form a V-shaped member with the other end of each leg joined to a different one of the plates. The plates and deformable member are integrally molded of a polymer, preferably Nylon.

A still further embodiment includes a support having a base with first and second opposing surfaces. The first surface is adapted to fasten to a conduit during use of the support. A first plate is connected to the base and has a width sized to fit through the space between the lips of the channel. The first plate also has first opposing ends spaced apart a distance about the same as the distance between the sides of the channel. A second plate has a width sized to fit through the space between the lips and, like the first plate, also has opposing second ends spaced apart a distance about the same as the distance between the sides of the channel. The second plate has its length aligned with the first plate. A first V-shaped deformable member has each leg of the first V joined to a different plate and also has a first bend at the juncture of the two legs of the V-shaped member. A second V-shaped deformable member has each leg of the second V joined to a different plate and also has a second bend at the juncture of the two legs of the V-shaped member. The first and second bends are located between the first and second ends and with the bend extending beyond the first and second plates as the distance between the plates is made smaller and the legs of the V shaped member move together.

In further variations of this latest embodiment, each of the first and second ends has two corners, one of which is a cammed corner and the other of which is located adjacent one of the bends. The cammed corners are on diagonal corners of each plate. Preferably, the support is integrally molded of a polymer. Preferably, the conduit comprises at least one elongated member, such as a pipe or elongated tube.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 11;

DETAILED DESCRIPTION

Referring to FIGS. 1-3 and 15, a support 20 for items 22 is provided. The support 20 is especially useful for use with elongated members such as pipes, electrical conduits and other tubular members, but it could also be used with discrete items such as security cameras or various sensors. For ease of reference these various items will be referred to as conduits 22. The support 20 has a base 24 adapted to hold one or more conduits 22. The support 20 has opposing first and second surfaces 26a, 26b, with a twist-lock mechanism 28 attached to the lower surface and the upper surface is adapted to hold the conduit(s) 22. The twist-lock mechanism 28 fits into a channel 30, rotates and is releasably locked to the channel.

The releasable lock 28 is described first. As used herein, the terms upper and lower are with respect to the orientation of the parts as shown in Figures, excluding FIGS. 2, 5-6 and 17, which have a different orientation. The actual orientation during use can vary with the orientation of the parts.

Figure 1:
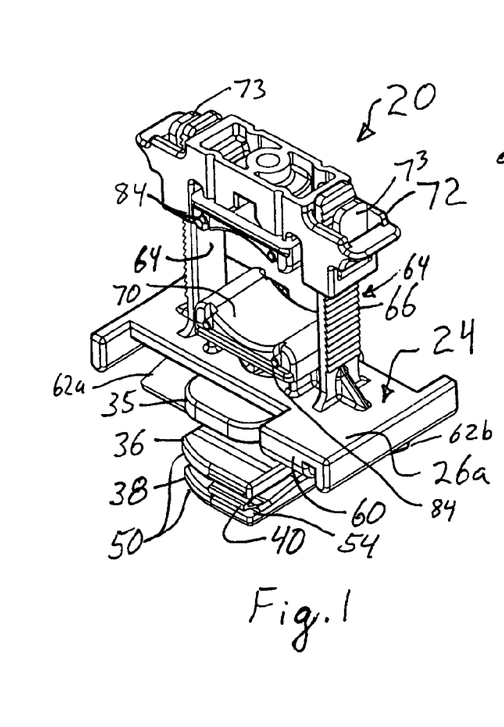
FIG. 1 is a top perspective view of a support having a twist-lock base and an adjustable size fastener for holding conduit to the base.
Figure 2:
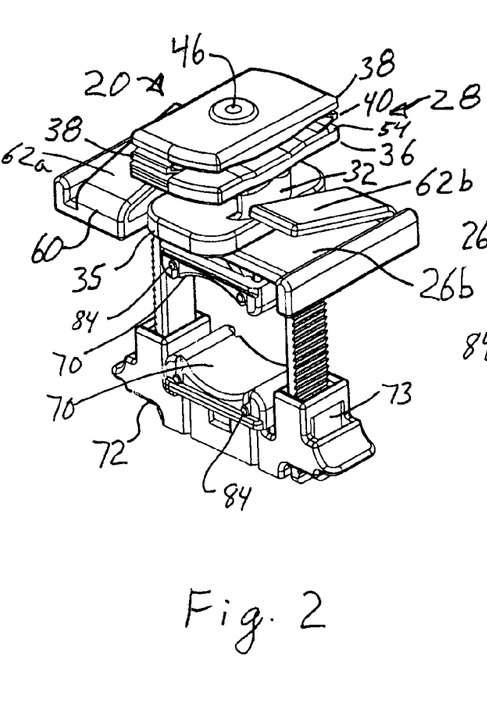
FIG. 2 is a bottom perspective view of the support of FIG. 1.
Figure 3:
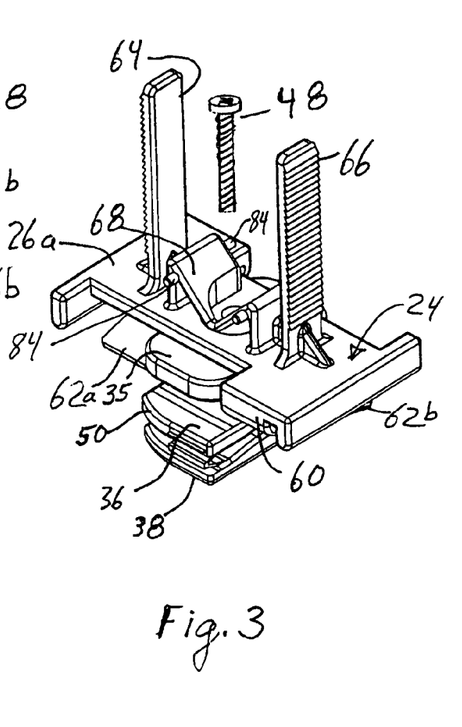
FIG. 3 is a top perspective view of the support of FIG. 1 without a top retainer.
Figures 4, 5, 6, 7, 8:
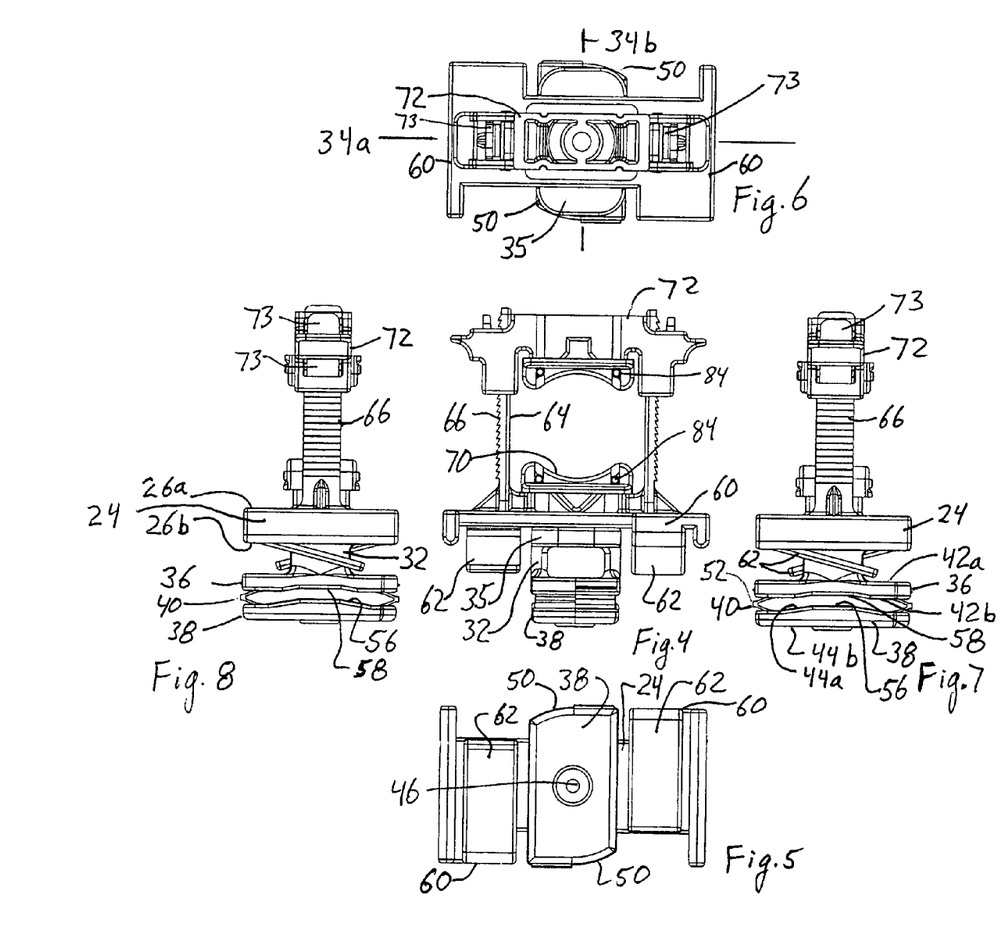
FIG. 4 is a front plan view of the support of FIG. 1 with the opposing view being the mirror image thereof.
FIG. 5 is a bottom plan view of the support of FIG. 4.
FIG. 6 is a top plan view of the support of FIG. 4.
FIG. 7 is a right plan side view of the support of FIG. 4.
FIG. 8 is a left plan side view of the support of FIG. 4.

Referring to FIGS. 1-8, the base 24 has a generally elongated shape with a major axis 34a and a minor axis 34b (FIG. 6). The base 24 is preferably, but optionally generally rectangular in shape. A first channel locking member 35 (FIG. 4) is optionally, but preferably formed on the lower surface 26b of the base 24, and an extender 32 (FIGS. 4, 8) extends from that locking surface. The locking surface 35 and extender 32 are at about the center of the base 24 relative to both the major and minor axes 34a, 34b.

A first plate 36 is formed on the end of the extender, and a second plate 38 is connected to the first plate by deformable members 40. The first plate 36 has upper and lower surfaces 42a, 42b (FIG. 7) on opposing sides of the first plate 36, and the second plate 38 has upper and lower surfaces 44a, 44b on opposing sides of the second plate 38. The base 24, channel lock 35, extender 32, first plate 36 and second plate 38 each have a hole 46 aligned along a straight line to receive a threaded fastener 48 (FIG. 3), such as a screw or bolt. A head of the fastener 48 abuts the upper surface 26a of base 24, and as the fastener turns the second plate 38 is drawn toward the first plate 36 and base 24, causing the deforming member 40 to bend and extend outward. Thus, as the plates 36, 38 move together (toward each other) the deforming member 40 extends outward beyond the adjacent periphery of plates 36, 38.

The upper and lower plates can have various shapes, but are shown as generally rectangular with diagonally opposing corners 50 (FIG. 5) being cammed to facilitate rotation in one direction. The cammed corners 50 are preferably curved, but could be an angled edge of the plate. Thus, the adjacent corners 50 of upper and lower plates 36, 38 are cammed, as are the adjacent corners 50 diagonally opposite. The remaining corners of plates 36, 38 are preferably generally square in order to resist rotation.

As best seen in FIGS. 1-2, 4 and 7-8, the deformable members 40 are located at opposing diagonal corners of the plates 36, 38, extending between the adjacent corners of the plate. The member 40 can have various shapes and fasten to the plates 36, 38 at various locations and orientations. As depicted, each member 40 has thin, wide strip of material with a bend 52 near the middle, and with the bend reversing the direction of the deformable member 40. Each deformable member 40 extends from the plate 36 or 36 at a location that is preferably, but optionally, in the outer ⅓ periphery of the plate. Alternatively, the connection is about ⅓ the way in from the edge of the plate 36, 38 with which the deformable member 40 is formed, or less. Further, the deformable member 40 in the illustrated embodiment joins the plate 36, 38 at an angle of about 30°, but the angle could vary. Preferably, but optionally, the bend 52 has a flat exterior surface of increased dimension for uses that are described later. The bend 52 is located at the edges of and between the plates 36, 38, and preferably, but optionally, a slight recess 54 (FIG. 1) is formed in the adjacent edges to receive this bend 52. A deformable member 40, about 0.4 inches wide and about 0.03 to 0.05 inches thick or less, is believed suitable when made of nylon. But the dimensions will vary with the particular configuration and use. The deformable members 40 join the plates 36, 38 in an orientation such that as the plates 36, 38 move toward each other, the deformable members 40 bend 52 moves outward.

Referring to FIGS. 7-8, the lower surface 42b of the first plate 36a faces the upper surface 44a of the second plate 38. The lower surface 42b preferably has a recess 56 shaped and sized to receive a mating projection 58 formed on upper surface 44a. The illustrated projection 58 has two inclined faces separated by a flat top, with rounded edges where the sides join the top. The recess 56 matches the shape of projection 58. The projection 58 extends from the juncture of one deformable member 40 to the juncture of the opposing deformable member 40, although the comparable dimension of the recess 56 is smaller.

Referring to FIGS. 1-2, 4-5 and 7-8, opposing ends of the base have outriggers 60 extending slightly downward, and first and second latch members 62a, 62b each extends from these outriggers 60. The latch members 62a, 62b each extend from a different end of the base and parallel to the end of the base. The latch members also extend downward toward and past the twist lock 28. The latch members 62a, 62b are located on opposing sides of the twist lock 28, and thus avoid abutting the parts 32, 35, 36, 38 and 40 that can be included in the twist-lock. The latch members 62a, 62b extend in opposing directions. A downward angle of 10-15° is believed suitable, but the angle can vary. The outriggers 60 offset the connection between the latch 62 and base 24 slightly downward. The outriggers 60 are believed optional, and the latches 62 could extend from the lower surface 26b of base 24.

The upper surface 26a of support 24 is adapted to connect to the conduit(s) 22. The depicted connection is as generally described in U.S. application Ser. No. 10/734,953, the complete contents of which are incorporated herein by reference. This connection uses spaced apart arms 64 extending from the base 24. The arms 64 have a plurality of ratchet teeth 66. A base 68a (FIG. 3) is shaped to receive a portion of the conduit 22, and a resilient cover 70 optionally covers the base. A V-shaped base 68a is shown. A retainer 72 extends between the arms 64 and has openings through which the arms pass. Pawls 73 on the sides of these openings mate with the ratchet teeth 66 on the arms to provide an adjustable retainer for the conduit(s) 22.

Figures 28, 29, 30, 31, 33:
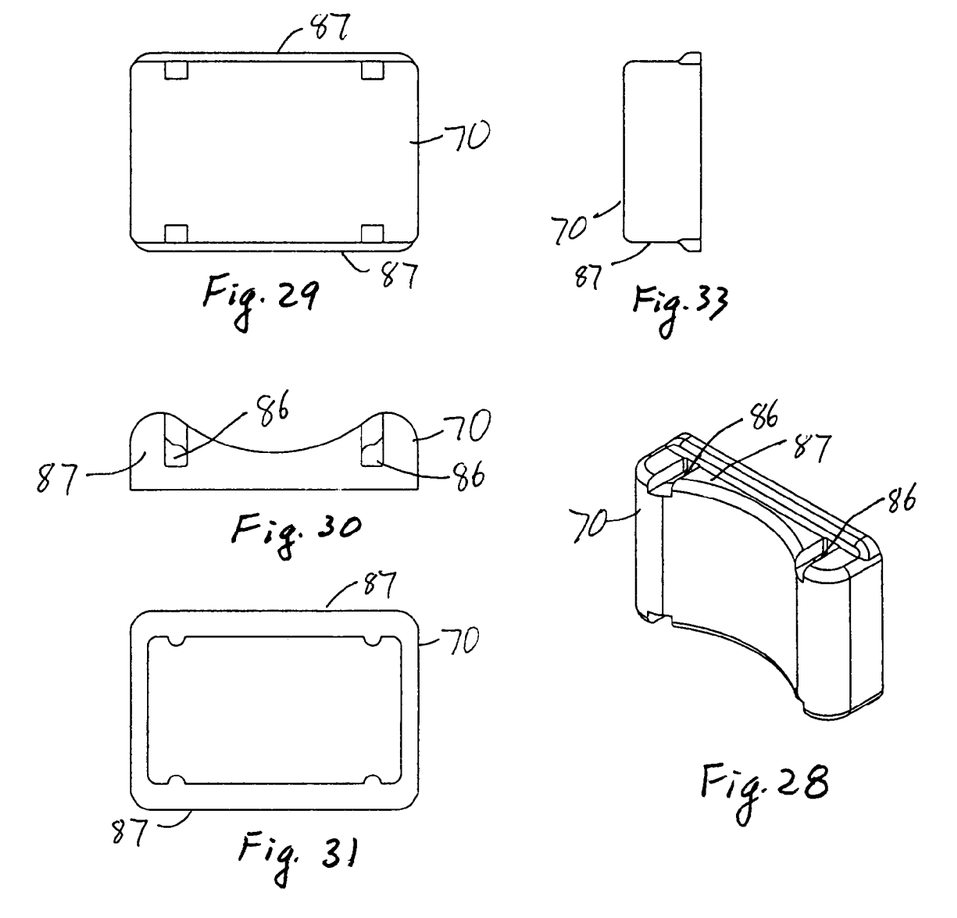
FIG. 28 is an upper perspective view of the cover used on a conduit support.
FIG. 29 is a front plan view of the cover of FIG. 28 and a top plan view of FIG. 30.
FIG. 30 is a side plan view of the cover of FIG. 29, with the opposing side being a mirror image thereof.
FIG. 31 is a bottom plan view of the cover of FIG. 30.
FIG. 33 is a right side plan view of the cover of FIG. 20.
Figure 32:
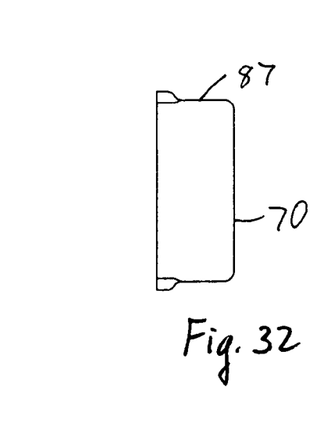
FIG. 32 is a left side plan view of the cover of FIG. 29.
Figures 34, 35, 36, 37, 38:
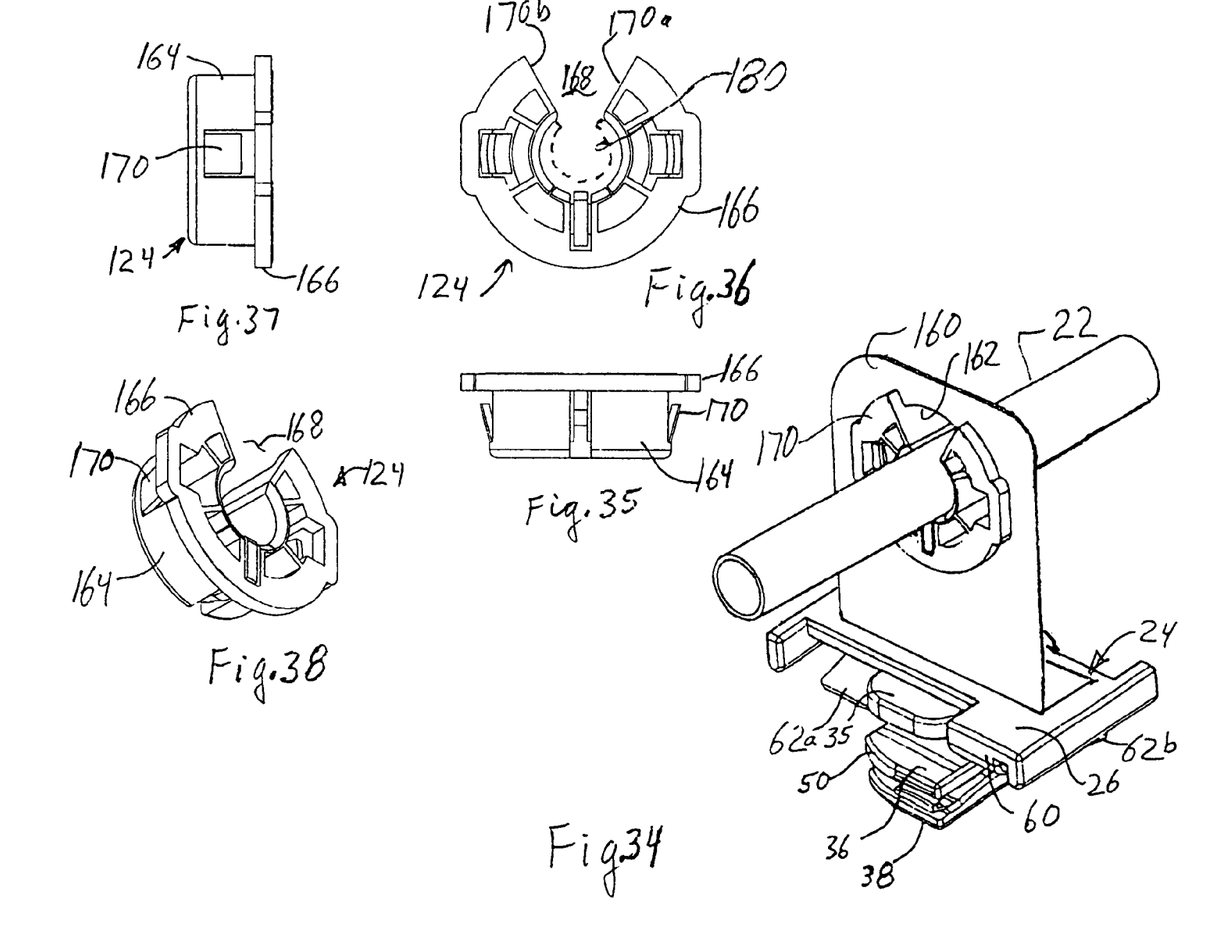
FIG. 34 is an upper perspective view of the support of FIG. 1 with a different conduit support holding the elongated member.
FIG. 35 is a side plan view of the conduit support of FIG. 34.
FIG. 36 is a top plan view of the conduit support of FIG. 35.
FIG. 37 is a side plan view of the conduit support of FIG. 36.
FIG. 38 is a bottom perspective view of the conduit support of FIGS. 34-37.
Figures 39, 43:
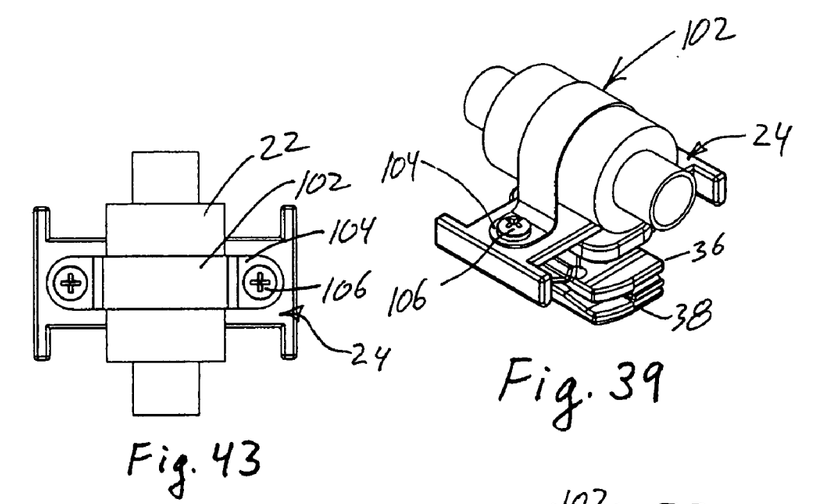
FIG. 39 is an upper perspective view of the conduit support of FIG. 1 with a different conduit connector.
FIG. 43 is a top plan view of FIG. 41.
Figure 40:
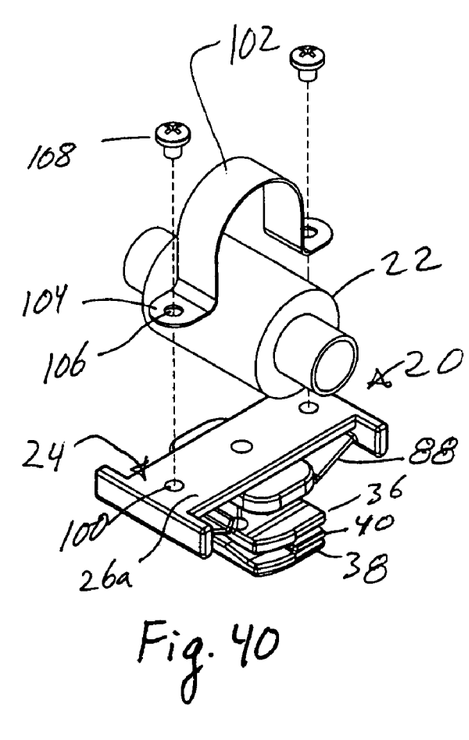
FIG. 40 is an exploded perspective view of FIG. 39.
Figures 41, 42:
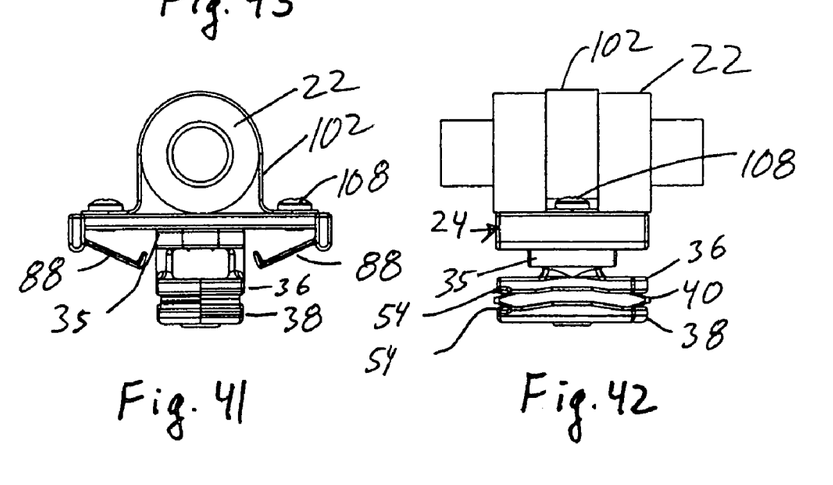
FIG. 41 is an end plan view of the conduit support and connector of FIG. 39.
FIG. 42 is a side plan view of FIG. 41.

In a broader sense, the ratchet arms 64 on are opposing sides of a first mounting block 68a contoured to abut the elongated member or item 22 at two spaced apart locations, and the retainer 72 having a two slots each located to receive the ratchet arms 64 with a pawl mechanism located on the retainer to releasably engage the ratchet arms. The retainer has a second mounting block 68b contoured to abut the elongated member or item at two spaced apart locations. The first and second blocks each have inclined surfaces forming a V-shape and comprising placing a resilient cover 70 over the inclined surfaces and holding the resilient cover in place by engaging projections 84 (FIGS. 1-3) on one of the cover 70 or block with recesses 86 (FIGS. 28, 30) on the other of the cover or blocks.

Figure 9:
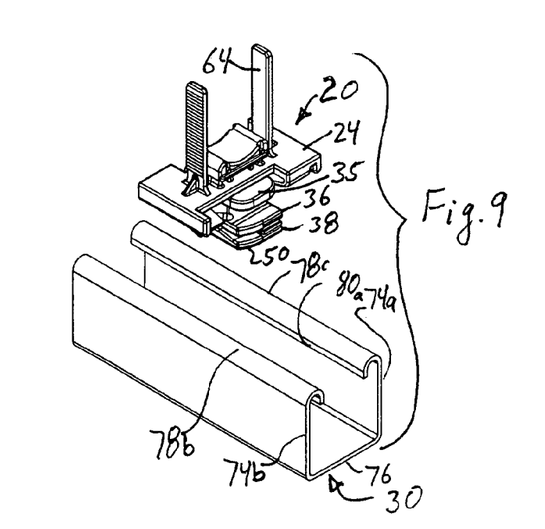
FIG. 9 is an exploded view of the support of FIG. 3 and a channel.
Figure 10:
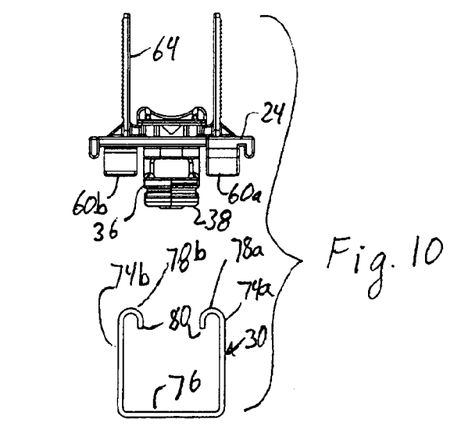
FIG. 10 is a side plan view of FIG. 9.

Before describing the use of the support 20, the channel 30 needs to be further described. Referring to FIGS. 9-10, the channel 30 has opposing sides 74a, 74b joined by a bottom or back 76. The sides 74 each have a distal end that extends inward, and that preferably forms a lip 78a, 78b having a curved top and a distal end 80a, 80b facing the back surface 76.

Still referring to FIGS. 9-14, the support 20 is placed above the opening formed between lips 78a, 78b of the channel 30, with the major axis 34a of plates 36, 38 aligned with the length of the channel 30 and its opening. The major axis of the plates 36, 38 is generally perpendicular to the major axis 34a of the base 24, so the base extends over the sides 74 of the channel, and perpendicular to the length of the channel. The plates 36, 38 are sized to have the narrow width of the plates pass through the opening between lips 78a, 78b. The latches 62 are located so they can abut the lips 78a, 78b when the plates 36, 38 are placed inside the channel 30 through the slot separating the lips 78. Preferably, but optionally, the distal end of latches 62 have a barbed end so the barb can slip underneath an end 80 and catch on that end if the support is twisted in a direction that would withdraw the latch from the channel 30.

Figures 11, 13:
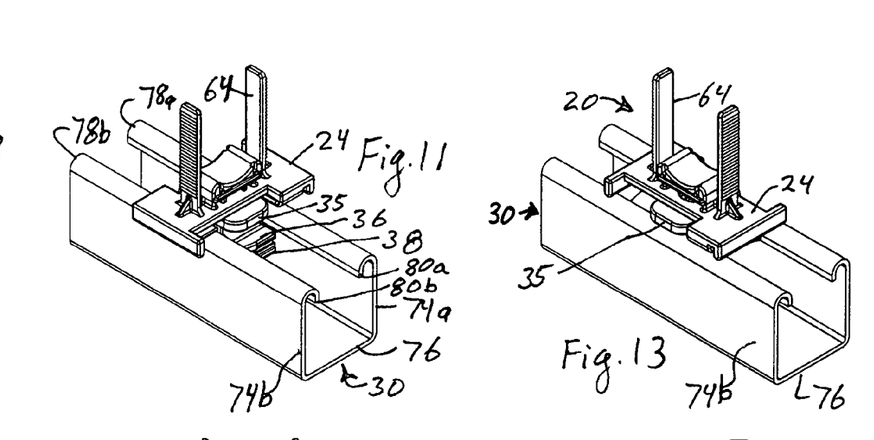
FIG. 11 is a top perspective view of the support of FIG. 3 inserted into the channel in an unengaged orientation.
FIG. 13 is a top perspective view of the support and channel of FIG. 11 with the support rotated into an engaged position.
Figure 12:
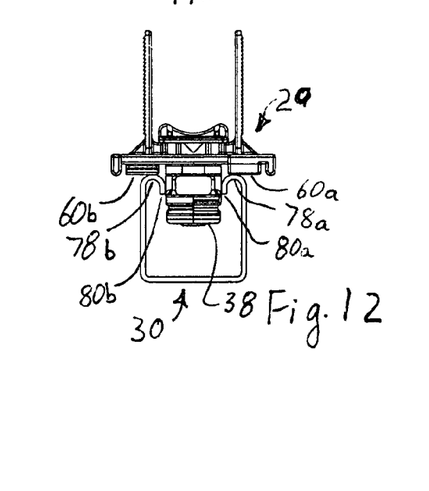
FIG. 12 is a side plan view of the support and channel of FIG.

Referring to FIGS. 11-12, the plates 36, 38 are placed inside the channel 30 and the base 24 is moved toward the channel 30 so the latches are pressed toward the base by the a butting lips 78. The extender is sized so that the upper surface of the channel locking member 35 can be placed into the area between lips 78, or on the lips 78, while the upper surface 42a of the first plate 36 is located at the distal ends 80 or between the distal ends 80 of the lips 78 and the back 76 of the channel.

Figure 14:
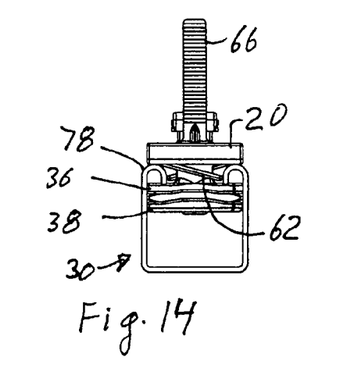
FIG. 14 is a side plan view of the support and channel of FIG. 13.
Figure 15:
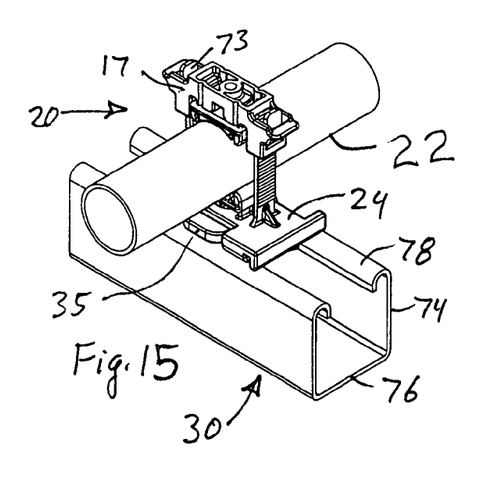
FIG. 15 is a top perspective view of the support of FIG. 1 engaged in a channel.
Figure 16:
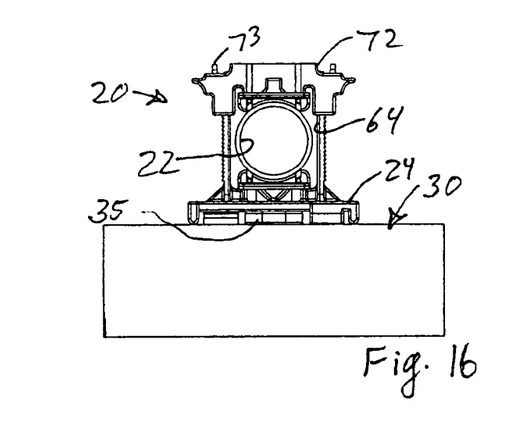
FIG. 16 is front plan view of FIG. 17, and of FIG. 15.
Figure 17:
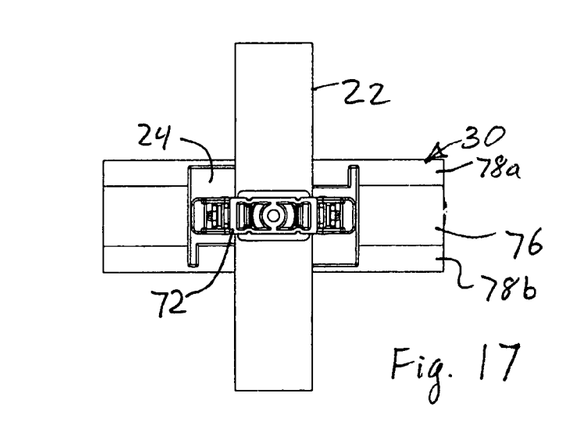
FIG. 17 is a top plan view of the support and channel of FIG. 15.
Figure 18:
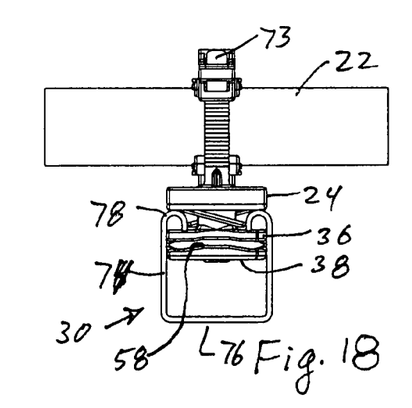
FIG. 18 is a side plan view of the support of FIG. 16, and of FIG. 15.

Referring to FIGS. 13-14, the support 20 is then rotated, about one quarter turn, so the channel engaging member 35 above and abuts the top of the lips 78 while the upper surface 42a of first plate 36 passes underneath the distal ends 80 of lips 78. The length of the extender 32 is selected so the first plate 36 is resiliently urged underneath the distal ends 80 of lips 78. The cammed surfaces 50 are orientated to make this rotation easier, and the flat portion of the ends that form the square corner resist rotating further. In the depicted embodiment, the rotation is one quarter turn clockwise. The lower surface of locking member 35 and the upper surface of first plate 36 can also, and optionally, be tapered or inclined or cammed adjacent the cammed ends 50 to make it easier to twist the support 20.

The length between the ends of the plates 36, 38 is such that the ends preferably, but optionally, abut the sides 74 of the channel 30. The distal end of the latches 62 extend toward the ends 80 of the lips 78. The latches 62 are orientated so that a counterclockwise rotation of the support 20 will cause the end of the latches 62 to abut the lips 78 or sides 74, thus resisting removal of the support 20 from the channel. The major axis of the support 20 extends along the length of the channel 30, which is a more stable configuration. Preferably, but optionally, the outriggers 60 extend below the base 24 a distance sufficient to abut the top edge of the lips 78, thus providing support at the ends of the base 24.

The threaded fastener 48 is then tightened. The cover 70 may have to be removed to allow easy access. But the head of the fastener 48 is accessible from outside the channel 30. As the fastener 48 is tightened, the second plate 38 is drawn toward the first plate 36. As the space between the plates 36, 38 becomes smaller, the bend 52 moves outward toward the side walls 74 as the bent portion is bent between the plates and the angle between the two legs forming the bent projection, decreases as the legs abut each other. As the bends 52 extend outward, each bend 52 is urged against one of the side walls 74a, 74b to create a frictional engagement, wedging lock with the side wall. The bend 52 preferably has a flat surface in order to increase the contact area with the side walls 74 and to strengthen the bend 52 and make it stiffer.

Referring to FIGS. 15-18, when the support 20 is fastened to the channel 30, the width of the support 24 is wide enough to extend across opposing lips 78a, 78b and are preferably, but optionally located to abut those lips. The width of the support 20 help stabilize the support 20, and even if support does not abut the lips 78, the support can still limit the motion of the support by hitting the lips if the support is distorted sufficiently. After the support is fastened to the channel 30, the conduit 22 is fastened to the support. In the depicted embodiment, this is achieved by placing the conduit 22 between the arms 64 and then tightening the retainer 72 to hold the conduit to the support 20.

The support 20 lends itself to a useful method for supporting conduit(s) 22. One or both of the first surface 26a of the support 20 and the retainer 72 can also be adapted to accept a resilient cap 70 or similar device to improve the isolation of vibrations between the channel 30 and the conduit 22.

The channel 30 is shown having a single part with a generally C-shaped cross section, and in such cases tabs optionally extend from the ends of the channel, with holes in the tabs to allow the channel to be fastened to supports spaced variable distances apart. Optionally, the channel 30 has two nested C-shaped sections so the length of the channel can be varied to extend between adjacent portions of a building, such as studs or other structural members. One such channel 30 is shown in U.S. Pat. No. 6,519,791, the complete contents of which are incorporated herein by reference.

During insertion of the plates 36, 38 into the channel 30, each bend 52 is preferably aligned with or in the same plane as the adjacent end of the plates 36, 38, and those parts abut or are very close to the side walls 74. Preferably the bend 52 extends slightly beyond the plane containing the ends of the plates 36, 38. A few thousandths of an inch is believed suitable for the illustrated embodiment. As the plates 36, 38 move toward each other and the deformable member 40 bends and extends outward, the bend 52 need only move a relatively small distance in order to increase the interference with the walls 74. A movement of a few thousandths of an inch is believed suitable, such as 0.030 to 0.040 inches, but larger or smaller movements could be accommodated with suitable designs using larger or stiffer members 40. The bend 52 is thus urged toward the walls with sufficient force to securely engage the plates 36, 38 inside the channel 30. The amount of desired outward motion of bends 52 also depends in part on the stiffness of the side walls 74 of the channel 30. Stiffer walls require less outward motion to generate a large engaging force.

The small angle of each of the two legs forming the bending member 40 with respect to the plate 36, 38 to which each leg is attached makes the bend 52 stiffly supported. The short length of the legs 52 also makes them stiffer, and less likely to buckle. Legs about 0.1-0.2 inches long, measured between the bend 52 and the attachment to one of the plates 36, 38, are believed suitable for the illustrated embodiment. The deformable member 40 is preferably formed with straight leg segments to better avoid bending when the bend 52 is urged against the walls 74, but curved legs are believed usable, especially if the adjacent plates 36, 38 help support the deformable member 40 or limit any deformation. While short legs, slightly inclined relative to the adjacent plate 36 or 38 are preferred, the legs can be longer or more steeply inclined as long as they are configured to achieve the desired wedging or engaging force.

As the plates 36, 38 abut each other, the bend 52 fits within recess 54 to provide further support for the thickened portion of the bend. Further, as the plates 36, 38 abut each other, the projection on second plate 38 fits into and eventually abuts the recess in the abutting first plate 36. As the first plate 36 is rotated beneath the lips 78, the plate 36 bows so that the central portion by the extender 32 is slightly above the distal ends 80a, 80b of the lips 78a, 78b while the ends of the plate 36 are abutting the lips. It is a slight, convex-shaped bow. The amount of bowing depends on the stiffness of the plate 36. As fastener 48 is tightened and the second plate 38 approaches the first plate 36, it is believed that the configuration of the plates 36, 38 and the location of deformable members 40 between the ends of the plates cause the ends of the plates 36, 38 to bow away from each other as the fastener 48 is tightened. This is believed to cause the ends of the first plate 36 to bow in a concave orientation causing the ends of the plate 36 to better engage the distal ends 80 of the lips 78. The distal ends 80 of the lips 78 are usually square cut and thus can dig into the abutting upper surface 42a of the first plate 36 to form a secure connection which helps resist loosening of the support 20 fastened within in the channel 30.

The base 24, extender 32, plates 36, 38 and deformable member 40 are preferably integrally molded of a suitable polymer. Integrally molded means simultaneously formed from a single piece of molten or heated material. Nylon is preferred, but other polymers are believed suitable, such as polyethylene or polypropylene. The fastener 48 is typically of metal, preferably steel, and more preferably stainless steel so it does not rust.

The support 20 lends itself to an advantageous method of supporting the conduit 22. A support 20 having a fastening mechanism suitable for the envisioned conduit 22 is selected. The support is also selected so the distance between the first support plate 36 and the base 24 or locking member 35 (if present) is about the same or smaller than the height of the lips 78. The support 20 is then oriented so the long axis 34a of plates 20 align with the elongated opening between the lips 78 of channel 30. The support 20 is inserted into the channel and rotated until the lips 78 are resiliently engaged between the base 24 and first plate 36, and preferably resiliently engaged between the locking surface member 35 and first plate 36. The cammed corners 50 facilitate this rotation, and the flats on the ends adjacent the cams help prevent over-rotation. The long axis of the support 20 is aligned with the long axis of the channel 30 when the rotation is completed. Preferably, but optionally, the width of the support is large enough to extend across the opposing lips 78a, 78b to further stabilize the support. The latches 62 extend into the channel 30 to prevent rotation of the support in a direction to remove the support. The fastener 48 is then placed through the aligned holes 46, if this was not done earlier, and the fastener is tightened to draw the second plate toward the first plate and move the bend 52 outward to bind against one of the adjacent walls 74. A conduit 22 is then fastened to the upper side of the support. In the illustrated embodiment this is achieved by optionally placing the cover 70 on the conduit support 68a, placing the conduit 22 on the support 68a, attaching the retainer 72 and tightening the retainer.

To remove the support, the conduit is disengaged from the support, although in some instances it may be left attached if it does not inhibit rotation of the support needed to disengage the support from the channel. Then the fastener 48 is loosened, and if needed, the plates 36, 38 are forced apart, as for example, by a screwdriver inserted into the gap between lips 78. The latches 62 are manually lifted out of the channel 30 enough to allow rotation of the support 20 to align the long axis 34a of the support with the length of the channel 30, whereupon the support and plates are removed from the channel. A quarter turn, counter-clockwise rotation is believed sufficient, with the cammed surfaces 50 helping to make the rotation easier.

Referring to FIGS. 1-3, and 19-21, a resilient cover 70 is placed over the base 68a. Preferably the V-shaped base 68a has a projection or latch member 84 extending outward from the edges of the base. Only one latch 84 could be used, but four of these latches 84 are preferred, and are shown extending generally parallel to the top surface 26a. The resilient cover 70 has openings or recesses 86 sized and located to engage the latches and restrain relative motion between the cover 70 and latch 84. The recesses 86 are shown as located in opposing sides 87 of the cover 70, but could be located in ends of the cover or on the top of the cover. The latches 84 engages the resilient openings 86 in the resilient covers 70 to hold the covers in position and to hold the covers from falling off. The latches 84 and resilient openings 86 form a simple detent latching mechanism. The projections 84 could be located on the cover 70, and the recesses 84 located on the bases 68.

As seen in FIGS. 1-3, and 19-28 similar latches 84 are formed on the V-shaped base 68b found on the retainer 72. The cover 70 for the conduit support 68b has correspondingly located and sized openings 84 to hold the cover 70 to the base 68a. The construction and operation of latches 84 and openings or recesses 86 is the same as previously described. The latches 87 and recesses 86 provide a positive connection to hold the cover 70 onto the support 68a, 68b, rather than relying on a frictional engagement of an elastic cover 70 to hold it onto the conduit support 68a, 68b. Details of one cover 70 are shown in FIGS. 28-31. The apparent slot above the opening 86 is a result of forming the cover 70 and allowing ready access to molding fixtures and pins.

In use, the cover 70 is preferably formed of a resilient material. The cover 70 is fit over the support 68 until the latches 74 extend through the openings 86 in the cover. The openings 86 are resilient as the cover 70 is resilient. The engaging latches 84 and opening 86 positively holds the cover onto the support so the cover does not fall off even if the support 20 is held or fastened in various orientations during installation and use.

Figure 19:
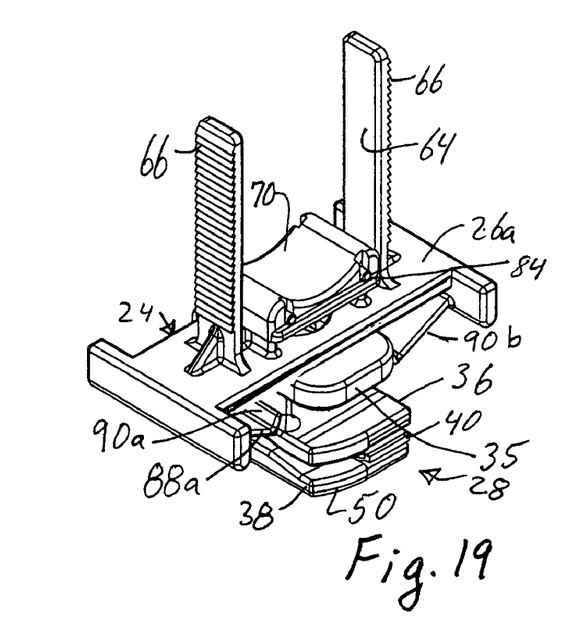
FIG. 19 is an upper perspective view of a further embodiment of the support of FIG. 1.
Figure 20:
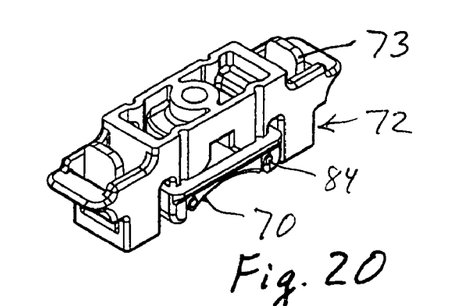
FIG. 20 is an upper perspective view of a retainer for use with the support shown in FIG. 19.
Figure 21:
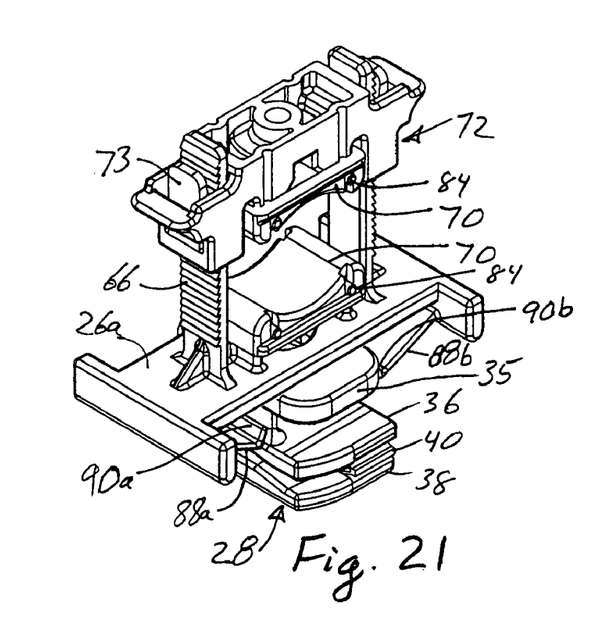
FIG. 21 is an upper perspective view of the support of FIG. 19 with the retainer of FIG. 20.
Figures 22, 23:
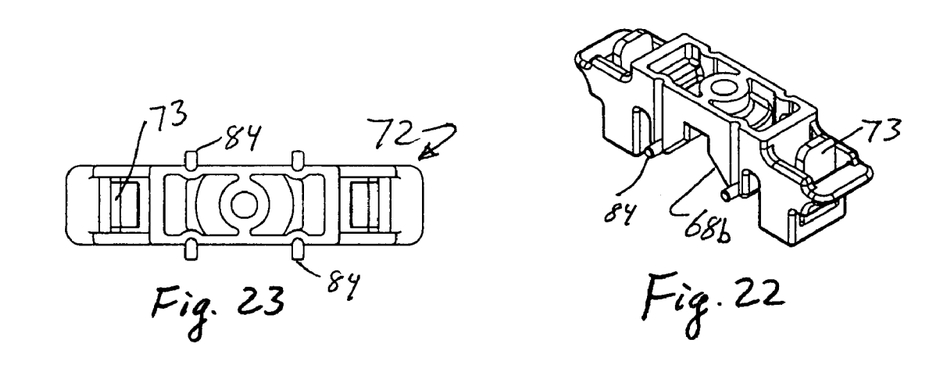
FIG. 22 is a perspective of the retainer of FIG. 20 without a cover on the conduit support.
FIG. 23 is a top plan view of the retainer of FIGS. 20 and 24.
Figure 24:
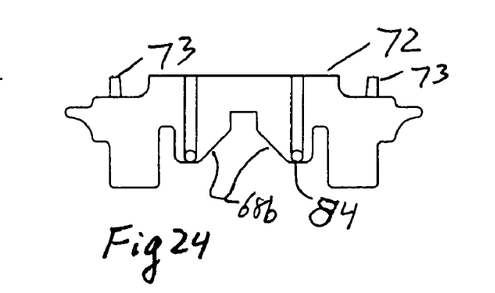
FIG. 24 is a side plan view of the retainer of FIG. 22 with the opposing side being the mirror image thereof.
Figure 25:
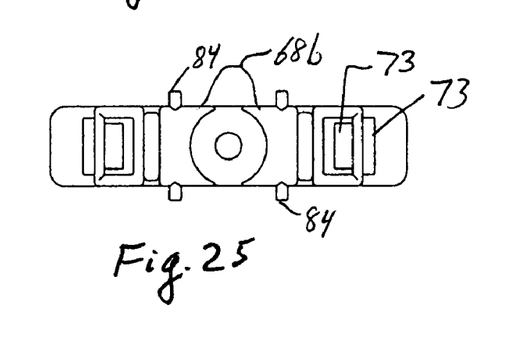
FIG. 25 is a bottom plan view of the retainer of FIGS. 22 and 24.
Figure 26:
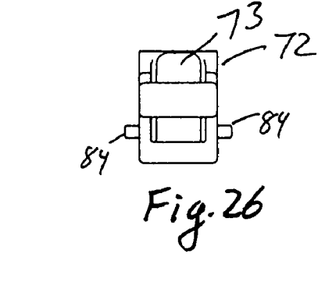
FIG. 26 is a left side view of the retainer of FIGS. 22 and 24.
Figure 27:
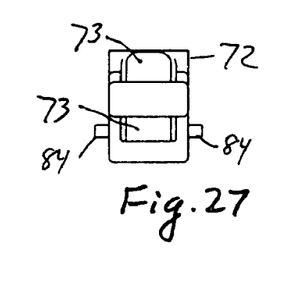
FIG. 27 is a right side view of the retainer of FIGS. 22 and 24.

Referring to FIGS. 9-14, the base 24 was latched onto the channel 30 using latches 62a, 62b that extend parallel to each other but perpendicular to the length of the channel 30 during use. A different embodiment is shown in FIGS. 19-21 in which latch members 88a, 88b are aligned on the same axis and are parallel to the length of the channel 30 during use. The latch members 88a, 88b each extend from a different end of the base 24 the outriggers 60 on base 24 toward each other and toward the twist lock 28, ending adjacent plates 38, 38. A downward angle of 10-15° is believed suitable, but the angle can vary. The outriggers 60 are believed optional, and the latches 88 could extend from the lower surface 26b of base 24. The distal end of the latch members 88a, 88b optionally has a slight ridge or flange 90a, 90b extending perpendicular to the length of the latch member 88a, 88b, back toward base 24. The latch members 88a, 88b are preferably flat strips integrally molded with base 24, and have a width about the same as and slightly smaller than the space or gap between lips 78 (FIG. 9).

Referring further to FIGS. 9-14, the latches 88a, 88b are installed similar to latches 62a, 62b, except the latches 88a, 88b fit between and engage lips 78 (FIG. 9) with the ridge or flange 90a, 90b providing a larger edge to abut the lips 78. But the latches 88 respond to a strong counter-clockwise force by riding up the inside of the lips 78 for removal from the channel 30 without having to manually deflect the latches, whereas latches 62 must be deflected toward the back wall 76 (FIGS. 9-14) in order to release the latches 62 them from the lips 78. Thus, latches 88 can be disengaged by rotating the support 20, whereas latches 62 require manual release of each latch.

Further, having latches 88a, 88b aligned along the same axis and aligned with the length of channel 30 can create a longer support 20 because of the required lever length of latches 88. The parallel orientation of latches 62a, 62b allows a shorter length of the base 24 and support 20, allowing more supports 20 and supported conduits for a given length of channel 30. But in some cases the ease of removal with the aligned latches 88 outweighs the potential advantages of the more densely packed spacing available with parallel latches 62.

The quarter-turn locking mechanism of the twist-lock 28 and latches 62, 88, can be used to provide a base 24 that is either flat, or configured with other brackets to hold conduit or to hold other devices to the channel 30. Thus, in a further variation the first surface 26 of base 24 could be fastened to a sheet of material forming form an opening, preferably a circular opening, or could support or form a ring-type structure sized so that an elongated tube or cable could pass through the opening or ring-sized structure.

In further variations, the base 24, or at least the first surface 26, could be attached to or could be integrally formed to have a configuration to engage an elongated member 22 as shown in each of the following patents as described therein: D490,690, D379,584 (base with a semicircular recess and a semicircular strap bolted thereto to encircle a pipe or elongated member 22); D368,422 (C-shaped holder with an elongated member 22 snap fit into the open portion of the C); U.S. Pat. No. 4,899,964 (one or more U shaped flanges with a mating member closing the open end of the U to encircle an elongated member 22); U.S. Pat. No. 5,876,000 (a ratchet member fastened to two opposing ratchet arms to urge holding an elongated member 22 to a base); U.S. Pat. No. 5,833,179 (elongated strap with semicircular recesses to hold various sized elongated members 22); U.S. Pat. No. 6,250,847 (pivoted strap encircles pipe or elongated member 22); U.S. Pat. No. 5,547,152 (L shaped bracket with one leg fastened to a duct or bracket and the other leg at an angle thereto and encircling an elongated member 22); U.S. Pat. No. 4,957,251 (semicircular flange with mounting tabs encircling a portion of an elongated member 22 with the tabs holding threaded fasteners fastened to a support); U.S. Pat. No. 4,763,867 (base with a spring element that is optionally corrugated to engage the elongated member 22); U.S. Pat. No. 4,037,810 (U shaped body portions holding elongated members 28). The complete contents of each of these above identified patents are incorporated herein by reference.

Further, the embodiments described herein, including the above patents which are incorporated herein by reference, are preferably made of polyvinylidine fluoride (PVDF), and more preferably integrally molded of a material having a substantial portion (over half and preferably over 90%) PVDF. Preferably the material is entirely PVDF. PVDF has flame retardant and smoke retardant properties that is desirable when the support 20 is placed in an air plenum in a building.

Referring to FIGS. 34-38, an L-shaped bracket 160 (FIG. 34) has one leg is fastened to first surface 26 of support 24, as for example, by being screwed or nailed or glued. The other portion of the L-shaped bracket 160 has one or more openings 162 configured to receive pipe support 124. This support 124 has a generally tubular base 164 with an outwardly extending flange 166. An opening or recess 168 is formed in the base 164 and flange 166, preferably formed from opposed inclined walls 170a, 170b having a radially inward spacing smaller than the size of conduit or elongated member 22, and having a radially outward spacing larger than the size of the conduit 22, so the conduit can snap into the center of the tubular base 122 and flange 166, and not readily slide radially outward. Resilient latches extend outward from the base 164 toward the flange 166.

In use, the conduit or elongated member 22 passes through the recess 168 and the base 164 is slid along the conduit and inserted through openings 162 in the bracket 160. The latches 170 and flange 166 are spaced apart so the support 160 is between them, providing a releasable latch connecting the support 124 to the bracket 160. In some applications the conduit 22 is passed through the openings 162 in the bracket 160, in other cases the opening 162 opens to an exterior surface of the bracket 160 so that the support 124 is first fastened to the conduit, and then the conduit and support 24 are inserted into an opening bracket 160. The support 122 of this embodiment is made of PVDF or other suitable plastic material as described herein. In this embodiment the first end 126 comprises flange 166 and/or latch(es) 170, while the second end 128 comprises base 164, with the intervening member 130 comprising the juncture between those ends.

Referring to FIG. 14, a further embodiment of support 24 is shown comprising a first end 26 having holes for screws to pass through to fasten to a portion of building 10. The connecting member 30 extends from the first end 26 to second end 28 (not shown) which has threads that screw into a mating threaded recess in the elongated member 22. In this embodiment, the elongated member 22 comprises a sensor, such as an imaging device.

Referring to FIGS. 39-43, a further device for fastening to conduit or items 22 is shown that uses the support 20. The top surface 26a of base 24 has at least one, and preferably a plurality of preformed holes 100 or indented locations for the easy formation of holes by threaded fasteners. The top surface 26a is generally flat with no other structure on it, although the surface could be contoured to mate with portions of the elongated member or item 22 A strap 102 has opposing ends 104 with holes 106 in those ends. Threaded fasteners 108 (e.g., screws, bolts, etc.) extend through the holes 106 and into holes or indentations 100 to releasably fasten the strap 102 to the support 24. The strap 102 is shown as comprising a U-shaped strap to encircle part of a cylindrical portion of item 22 and clamp it to the base 24.

The installation of support 24 to channel 30 is as previously described. The first and second plates 36, 38 of support 24 are inserted into a channel member 30 (FIGS. 9-14) and rotated one-quarter turn. That can be achieved using one hand and the plates wedge against the sides 74 enough to hold the support 20 in place. Fastener 48 is then inserted and tightened to draw the plates 36, 38 toward each other and wedge the deformable member 40 against sides 74 of the channel 30. Latches 88 enter the slot between lips 78 and restrict the rotation needed for removal of the support 20. The ends of the lips 80 abut the first plate 36 and prevent withdrawal of the plate(s) from the channel 30. The item 22 (FIGS. 39-43) is then placed on the base 24 and strap 102 fastens the item 22 to the base using threaded fasteners 108.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention disclosed herein, including various ways of shaping and locating the deformable members 40, and of configuring the mechanism for fastening elongated members 22 to the base 24. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A support for items in combination with a channel member holding the support, comprising:

a channel member having opposing sides joined by a back, the sides being spaced a distance apart and each ending in a lip extending toward the other lip and then toward a back wall of the channel;

a support comprising:

a base having first and second opposing surfaces;

a first plate fastened to the second surface of the base, the first plate having opposing first and second ends defining a length about the same as the distance between the opposing sides of the channel member with at least one end of the first plate having a corner that is cammed;

a second plate offset from and aligned with the first plate, the second plate having opposing first and second ends defining a length about the same as the distance between the opposing sides of the channel member with at least one end of the second plate having a corner that is cammed;

a first deformable member extending between adjacent first ends of the first and second plates and a second deformable member extending between adjacent second ends of the first and second plates, the deformable members each having a bend orientated to extend beyond the ends of the plates as the plates move toward each other.

2. The combination of claim 1, wherein a lower surface of the first plate faces an upper surface of the second plate, and the lower surface has a recess configured to receive a projection on the upper surface.

3. The combination of claim 1, wherein the support is integrally molded of a polymer material.

4. The combination of claim 1, wherein each deformable member has a width that is less than about half a width of the first plate and has an edge extending along a side of the first plate.

5. The combination of claim 1, wherein the deformable member is connected to the first and second plates at a location located in the outer ⅓ periphery of each plate.

6. The combination of claim 1, wherein the first and second deformable members are located between diagonally opposing corners of the first and second plates.

7. The combination of claim 1, wherein the first plate has two cammed portions, located at diagonally opposing corners of the first plate, and the second plate has two cammed portions, located at diagonally opposing corners of the second plate.

8. The combination of claim 1, wherein the first surface of the base is adapted to fasten to an elongated tubular member.

9. The combination of claim 1, wherein the first surface of the base contains at least one recess located so that a threaded fastener extending through the recess will draw the second plate toward the first plate.

10. The combination of claim 1, wherein the first surface of the base is configured to engage an elongated member and further comprising the elongated member.

11. The combination of claim 1, wherein the base and first and second plates each has an elongated shape with a major and minor longitudinal axis with the major longitudinal axes of the base being perpendicular to the major longitudinal axes of the plates.

12. The combination of claim 1, wherein the base has opposing ends with an elongated spring member extending from a lower surface of the base adjacent each end in a direction substantially parallel to a long axis of the first plate.

13. The combination of claim 1, wherein the base has opposing ends with an elongated spring member extending from a lower surface of the base adjacent each end in a direction substantially perpendicular to or parallel with a long axis of the first plate.

14. The combination of claim 1, further comprising an offset between the base and the first plate sufficient to locate the upper surface of the first plate below but adjacent to an interior end of a lip on the channel during use of the support.

15. The combination of claim 1, further comprising a threaded fastener extending through the base and plates to draw the second plate toward the first plate.

16. The combination of claim 1, wherein the deformable member comprises two legs joined by a bend, the legs fastened to adjacent surfaces of opposing plates, the two bends being between diagonally opposing corners of the plates.

17. A combination of a support for items and a channel member holding the support, comprising:

a channel member having opposing sides joined by a back, the sides being spaced a distance apart and each ending in a lip each extending toward the other lip and then toward a back wall of the channel;

a support comprising:

a base having first and second opposing surfaces;

a first plate fastened to the second surface of the base, the first plate having opposing first and second ends defining a length about the same as the distance between the opposing sides of the channel member;

a second plate offset from and aligned with the first plate, the second plate having opposing first and second ends defining a length about the same as the distance between the opposing sides of the channel member, the length of the first and second plates being smaller than a distance between opposing sides of the channel and greater than a distance between the lips so the first and second plates can fit inside the channel member during use;

a deformable member connecting the first and second plates, the deformable member having a bend moving outward toward an adjacent side of the channel during use when the first and second plates are inside the channel with the ends adjacent a side and as the space between the plates is reduced, the member moving outward a distance sufficient to press against the adjacent side during use; and a conduit holding mechanism on the first surface of the support, the mechanism being adapted to fasten a conduit to the support.

18. The combination of claim 17, wherein the deformable member comprises two legs having a first end joined at the bend to form a V-shaped member with the other end of each leg joined to a different one of the plates, the plates and deformable member being integrally molded of a polymer.

19. A support for items and a channel member holding the support, comprising:

a channel member having opposing sides joined by a back, the sides being spaced a distance apart and each ending in a lip having a distal end located inward of the side to which the lip is connected;

a support comprising:

a base having first and second opposing surfaces, the first surface being adapted to fasten to a conduit during use of the support;

a first plate connected to the base and having a width sized to fit through the space between the lips and first opposing ends spaced apart a distance about the same as the distance between the sides of the channel;

a second plate having a width sized to fit though the space between the lips and second opposing ends spaced apart a distance about the same as the distance between the sides of the channel, the second plate having its length aligned with the first plate;

a first V-shaped deformable member having each leg of the first V joined to a different plate and a first bend at the juncture of the two legs of the V-shaped member;

a second V-shaped deformable member having each leg of the second V joined to a different plate and a second bend at the juncture of the two legs of the V-shaped member, the first and second bends being located between the first and second ends and with the bend extending further beyond the first and second plates as the distance between the plates is made smaller and the legs of the V shaped member move together.

20. The support and channel member of claim 19, wherein each first and second end has two corners one of which is a cammed corner and the other of which is located adjacent one of the bends with the cammed corners being on diagonal corners of each plate, and wherein the support is integrally molded of a polymer, and wherein the conduit comprises at least one elongated member.

21. A clamp assembly for releasably securing an elongated member having a longitudinal axis to a structural support in combination with that support, the combination comprising:
a channel member having opposing sides joined by a back, the sides being spaced a distance apart and each ending in a lip having a distal end located inward of the side to which the lip is connected;
a clamp assembly, comprising:
a clamp base having first and second opposing surfaces with a pair of ratchet arms extending outward from the first surface of the base, each arm having a plurality of ratchet teeth formed along at least one surface thereof and the arms being generally parallel, the clamp base having a first support for the elongate member that includes at least two inclined surfaces forming a generally V-shaped notch that opens in the same direction the arms extend;
a clamping block having openings each of which is sized and located to receive one of the ratchet arms, the clamping block having a pawl located in each opening, the pawl having at least one pawl tooth with the pawl located and configured to releasably engage the ratchet teeth when the ratchet arm extends into the opening a distance sufficient to engage the at least one pawl tooth, the clamping block having a second support for the elongate member that includes at least two inclined surfaces forming a generally V-shaped notch that opens toward the clamp base when the ratchet arms are inserted into the openings;
a first plate connected to the second surface of the clamp base and having a width sized to fit through the space between the lips and first opposing ends spaced apart a distance about the same as the distance between the sides of the channel so the first plate can be inserted into the channel between the lips and then rotated so each end of the first plate is located between one of the sides of the channel and the lip adjacent that side of the channel so that the lips abut the first plate to restrain removal of the first plate from the channel;
a second plate having a width sized to fit through the space between the lips and opposing second ends spaced apart a distance about the same as the distance between the sides of the channel, the second plate having its length aligned with the first plate and being connected to the first plate; and
a first deformable member extending between adjacent first ends of the first and second plates and a second deformable member extending between adjacent second ends of the first and second plates, the deformable members each having a bend orientated to extend beyond the ends of the plates as the plates move toward each other.

22. The combination of claim 21, further comprising a cap on at least one of the clamp base and clamping block.

23. The combination of claim 21, wherein the clamp base and first plate are integrally molded of plastic.

24. The combination of claim 21, wherein at least one of the clamp base and clamping block have a plurality of latches extending therefrom, and further comprising a cover configured to fit over one of the V-shaped notches and having recesses therein located to engage some of the latches to hold the cover in position.

25. The combination of claim 17, wherein the conduit holding mechanism comprises a strap having opposing ends fastened to the base by threaded fasteners.

26. The combination of claim 17, wherein the conduit holding mechanism comprises a strap having opposing ends fastened to the base by threaded fasteners.

27. The combination of claim 17, wherein the conduit holding mechanism comprises a clamping block having openings each of which is sized and located to receive one of the ratchet arms, the clamping block having a pawl located in each opening, the pawl having at least one pawl tooth with the pawl located and configured to releasably engage the ratchet teeth when the ratchet arm extends into the opening a distance sufficient to engage the at least one pawl tooth, the clamping block having a second support for the elongate member that includes at least two inclined surfaces forming a generally V-shaped notch that opens toward the clamp base when the ratchet arms are inserted into the openings.

28. A method of providing a support for fastening members to elongated channels, comprising:
inserting into a slot of an elongated channel a support having a first and second plate separated by a first distance and joined by a deformable member which extends beyond a periphery of the plates when the first distance reduces; the first plate being fastened to a locking member that is spaced apart from the first plate a second distance selected to place the top and distal edge of the lips between an upper surface of the first plate and a lower surface of the locking member, the elongated channel having a back with two parallel sides and a pair of lips opposite the back that extend toward each other and then extend toward the back, the lips spaced apart to define the slot between the lips, the slot extending along a length of the channel, the lips having a top and having a distal edge that extends toward the back a predetermined distance from the to of the lip;
rotating the first and second plates and locking member a quarter turn so that ends of the first and second plates abut the sides of the channel;
moving the first and second plates toward each other and extending the deformable member beyond a periphery of the plates;
fastening an item or elongated member to the support.

29. The method of claim 28, wherein the support has a base fastened to the locking member, and further comprising fastening first and second ends of a strap to the base with the elongated member or item interposed between the strap and the base.

30. The method of claim 28, wherein the support has a base fastened to the locking member, the base having two upright ratchet arms on opposing sides of a first mounting block contoured to abut the elongated member or item at two spaced apart locations, and a retainer having a two slots each located to receive the ratchet arms with a pawl mechanism located on the retainer to releasably engage the ratchet arms, the retainer having a second mounting block contoured to abut the elongated member or item at two spaced apart locations, and comprising: placing the elongated member or item against the first block and tightening the retainer until the second block abuts the elongated member or item and urges the elongated member or item against the first block at which point the pawls cooperate with the ratchet arms to hold the elongated member or item in position.

31. The method of claim 28, further comprising integrally molding the support of PVDF.

32. The combination of claim 21, wherein the support is integrally molded of PVDF.

* * * * *